May 30, 1950 — G. E. BERGGREN — 2,509,668
APPARATUS FOR CONTINUOUSLY MAKING VULCANIZED ARTICLES
Filed Oct. 30, 1947
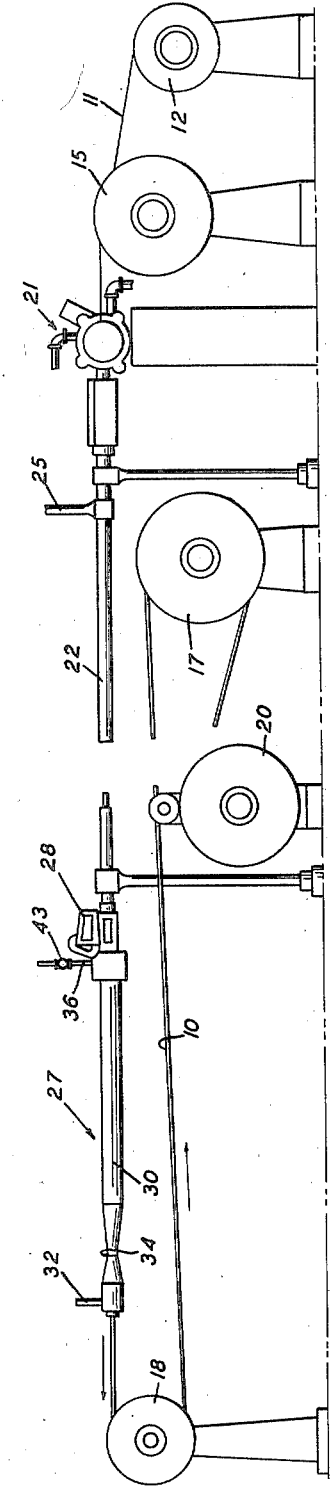
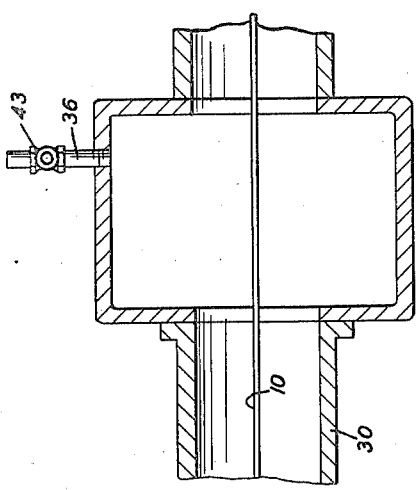
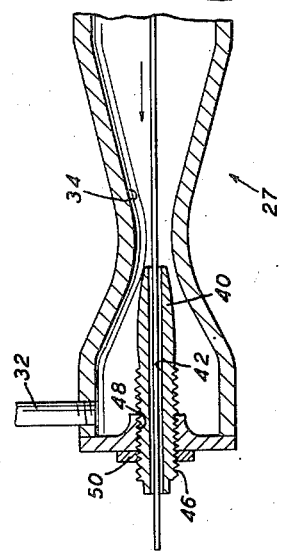
FIG. 1
FIG. 2
INVENTOR
G. E. BERGGREN
BY
ATTORNEY Patented May 30, 1950

2,509,668

UNITED STATES PATENT OFFICE 2,509,668

APPARATUS FOR CONTINUOUSLY MAKING VULCANIZED ARTICLES

George E. Berggren, Baltimore, Md., assignor to Western Electric Company, Incorporated, New York, N. Y., a corporation of New York Application October 30, 1947, Serial No. 783,122

8 Claims. (Cl. 18—6)

1

This invention relates to apparatus for continuously making vulcanized articles, and more particularly to apparatus for cooling continuous lengths of filamentary vulcanized articles emerging from vulcanizing tubes having steam under high pressure therein and for sealing the steam in the vulcanizing tubes.

In the manufacture of filamentary articles having coverings of vulcanizable compounds over cores which include moisture, usually present in elements of hygroscopic materials, such as textile materials, such a core is sometimes passed through an extruder for extruding a covering of vulcanizable compound thereover, and then through a vulcanizing tube to vulcanize the covering. The vulcanizing tube has steam at high temperature and under high pressure therein, and heat from the steam is absorbed by all elements of the core. While the core is in the vulcanizing tubes and subject to the high pressures of the steam on its outer surface, no damage is done. However, if the core is not cooled sufficiently before it is withdrawn into the atmosphere, the stored heat will convert moisture inside the covering into steam, which is likely to create pressure sufficient to rupture or blister the covering.

In order to sufficiently cool the covering and the vaporized moisture while the covering is still under a high pressure, cold water under a pressure substantially the same as that of the steam in the vulcanizing tube is sometimes introduced into a seal extending from the exit of the vulcanizing tube. In the past, such seals have required many pressure-reducing baffles with openings therein sufficiently large to prevent scraping the covered cores, and much cooling water is lost therethrough without fully utilizing the cooling potential thereof. In order to accommodate covered cores of various sizes and shapes many interchangeable sets of baffles having orifices of different sizes have been required.

An object of the invention is to provide new and improved apparatus for continuously making vulcanized articles.

A further object of the invention is to provide new and improved apparatus for preventing the escape of steam from vulcanizing tubes into the atmosphere and for cooling under external pressure articles being withdrawn from the tubes to reduce the internal pressure of heated moisture in the articles sufficiently to prevent rupturing the articles, and to effect large reductions in the quantity of cooling and sealing water required per unit of length of the articles.

2

An apparatus for continuously making vulcanized articles illustrating certain features of the invention includes an elongated vulcanizing tube and a cooling and sealing tube connected to the exit end of the vulcanizing tube. A Venturi tube outlet for a filamentary article vulcanized in the vulcanizing tube is provided at the exit end of the cooling and sealing tube, and water under pressure is introduced into the cooling and sealing tube at the exit end thereof and flows toward the entrance end of the cooling and sealing tube to seal the Venturi tube outlet and cools the article while under pressure.

A complete understanding of the invention may be obtained from the following detailed description of an apparatus forming a specific embodiment thereof, when read in conjunction with the appended drawing, in which:

Fig. 1 is a fragmentary side elevation of an apparatus embodying certain features of the invention, and Fig. 2 is an enlarged fragmentary, partially sectional view of a portion of the apparatus.

Referring now in detail to the drawing, there is shown therein a continuous extruding and vulcanizing machine for forming and vulcanizing continuously a protective covering 10 (Fig. 1) around a conductive core 11, which may include conductive elements and hygroscopic elements, to form a covered core. In forming the covering upon the core, the core is advanced continuously from a supply reel 12 at a high rate of speed by a capstan 15, and is advanced continuously from the supply capstan 15 by a takeup capstan 17 over a return sheave 18 to a takeup reel 20. As the core is drawn from the supply capstan 15, it passes through an extruder 21, which extrudes the covering of vulcanizable compound thereover. The construction and operation of the extruder 21 and the capstans 15 and 17 are substantially identical to the elements corresponding thereto disclosed and claimed in copending application Serial No. 697,809, filed September 18, 1946, by D. D. Jones for "Apparatus for covering cores." The covered core then passes into an elongated vulcanizing tube 22, which has steam under a high pressure supplied thereto by a steam pipe 25, whereby the covering of vulcanizable compound is vulcanized as it is advanced through the vulcanizing tube. The covered core passes from the vulcanizing tube directly into and through a pressure cooling and sealing unit 27 to the sheave 18, from which it is advanced to the capstan 17. A splice box 28 connects the cooling and sealing unit to the vulcanizing tube.

Cold water under pressure is introduced into a tube 30 of the pressure cooling and sealing unit 27 through an inlet pipe 32 connected to the tube 30 near the exit end thereof. Substantially all the water flows from the inlet pipe from left to right, as viewed in Fig. 2, through a doubly tapered restricted portion 34 of the tube 30 to an outlet pipe 36 connected to the entrance end of the tube. As the water flows through the restricted portion of the tube 30, the velocity pressure thereof increases, and the static pressure thereof decreases. The decrease in static pressure is sufficient to cause the pressure on the water at the right hand end, as viewed in Fig. 2, of a nozzle 40 to be slightly higher than that of the atmosphere. Thus, only a small portion of the water escapes with the covered core as the covered core is advanced through a passage 42 in the nozzle 40 even though the passage 42 is much larger than the covered core advancing therethrough. The diameter of the passage 42 is large enough to permit covered cores of any size and shape normally required to be advanced therethrough without abrading the coverings.

A standard temperature-controlled reducing valve 43 is connected to the outlet pipe 36. The valve 43 is adjusted automatically to limit the rate of flow of the cooling water through the tube 30 to that required to cool the covered core 11 most efficiently.

The nozzle 40 is provided with a threaded portion 46 designed to adjustably engage a tapped bore 48 formed in the end of the tube 30. The pressure reduction effected by the nozzle 40 and the restricted portion 34 may be increased by advancing the nozzle farther into the tube 30, and may be decreased by retracting the nozzle farther out of the tube 30. A lock nut 50 locks the nozzle in any adjusted position.

*Operation*

In the operation of the apparatus described hereinabove, the covering 10 is formed around the core 11 by the extruder, and the resulting covered core is heated under pressure by high pressure steam introduced into the vulcanizing tube 22 to vulcanize the covering 10. The cold water introduced into the exit end of the tube 30 of the pressure cooling and sealing unit 28 is under a static pressure at the entrance end of the tube 30 sufficient to maintain the steam in the vulcanizing tube 22. The water flows through the tube 30 counter to the direction of movement of the covered core and is heated by the core as the water cools the core. Thus, the water entering the tube 30 is heated as it flows therethrough, and the covered core is cooled as it is advanced through the tube so that substantially the same cooling effect is obtained upon each increment of the covered core throughout the portion thereof in the tube 30.

As the water flows through the restricted portion 34 of the tube 30, its velocity increases and its static pressure decreases to slightly above that of the atmosphere. Hence, only a small portion of the water flows through the nozzle 40 with the covered core. After the water flows past the restricted portion 34 its velocity decreases and the static pressure thereof rises to that of the steam in the vulcanizing tube 22 so that the steam is prevented from entering the tube 30.

The pressure cooling and sealing unit 27 serves to effectively cool the covered core 11 under pressure, and all the water to the right of the restricted portion 34 of the tube 30 is under a static pressure as high as that of the steam in the vulcanizing tube 22. The high pressure of the water expedites the cooling of the covered core and prevents any blistering of the covering 10 from internal vapor pressure. Also, only the short space between the right hand end of the restricted portion 34 of the tube 30 and the exit end of the cooling and sealing unit is required for the above-described elements which reduce the static pressure of the water from that of the steam to that of the atmosphere, often a reduction of as high as 260 pounds per square inch. The water per unit of length of the covered core 11 required for the above-described unit to cool the covered core 11 is only a small fraction of that required by cooling and sealing units of the baffle type. Since the passage 42 in the nozzle 40 is large and the nozzle can easily be adjusted to different positions, the above-described unit may be used for covered cores over a wide range of sizes. Furthermore, it is much easier to "string up" the above-described unit than to do this with baffle-type cooling and sealing units.

What is claimed is:

1. An apparatus for continuously making vulcanized articles, which comprises an elongated vulcanizing tube, a cooling and sealing tube having a Venturi tube outlet at the exit end thereof, means for introducing water under a high pressure into the exit end of the cooling and sealing tube, and means for withdrawing water from the cooling and sealing tube.

2. An apparatus for continuously making vulcanized articles, which comprises an elongated vulcanizing tube, a cooling and sealing tube having an adjustable Venturi tube outlet at the exit end thereof, means for introducing water under a high pressure into the exit end of the cooling and sealing tube, and means for withdrawing water from the cooling and sealing tube.

3. An apparatus for continuously making vulcanized articles, which comprises an elongated vulcanizing tube, a cooling and sealing tube having a Venturi tube outlet at the exit end thereof, means for introducing water under a high pressure into the exit end of the cooling and sealing tube, means for withdrawing water from the cooling and sealing tube, and means for adjusting the water-withdrawing means to control the rate of flow of the water through the cooling and sealing tube.

4. In an apparatus for continuously making vulcanized articles including a vulcanizing chamber through which a filamentary article is advanced, a pressure cooling and sealing unit which comprises a tube connected to the exit of the vulcanizing chamber through which tube the article is advanced, said tube having a predetermined diameter throughout a portion of its length and having a restricted portion near the exit end thereof substantially smaller in diameter than the first-mentioned portion thereof, a nozzle extending from the exit end of the tube to the restricted portion thereof, a water inlet connected to the tube at a point spaced beyond one end of the restricted portion of the tube, and a water outlet connected to the tube at a point spaced beyond the other end of the restricted portion of the tube.

5. In an apparatus for continuously making vulcanized articles including a vulcanizing chamber through which a filamentary article is advanced, a pressure cooling and sealing unit which comprises a tube connected to the exit of the vulcanizing chamber through which tube the article is advanced, said tube having a predetermined diameter throughout a portion of its length and having a restricted portion near the exit end thereof substantially smaller in diameter than the first-mentioned portion thereof, a tubular nozzle extending from the exit end of the tube to the restricted portion thereof, means for mounting the nozzle adjustably with respect to the tube, a water inlet connected to the tube at a point spaced beyond one end of the restricted portion of the tube, and a water outlet connected to the tube at a point spaced beyond the other end of the restricted portion of the tube.

6. In an apparatus for continuously making vulcanized articles including an elongated vulcanizing chamber and means for introducing into the chamber a vulcanizing medium under a high pressure and at a high temperature, a pressure cooling and sealing unit which comprises a tube having end portions having a diameter of at least a predetermined size and a tapered restricted orifice positioned between the end portions and having a diameter substantially smaller than those of the end portions at the smallest portion of the orifice, means for forcing a cooling medium through one end portion of the tube, the orifice and the other end portion of the tube, a tubular nozzle extending from one end of the tube to the orifice thereof, said nozzle serving to permit a filamentary article to be advanced therethrough, and means for adjusting the nozzle axially with respect to the orifice.

7. In an apparatus for making vulcanized articles including an elongated vulcanizing chamber, means for introducing into the chamber a vulcanizing medium under high pressure and at a high temperature, a pressure cooling and sealing unit which comprises a tube connected to the vulcanizing chamber having a tubular, double re-entry orifice positioned between the entrance end thereof and the exit end thereof at a point near the exit end thereof, said tube being provided with a tapped bore in the exit end thereof, means for introducing into the tube at a point between the exit end of the tube and the double re-entry orifice therein cold water under a static pressure substantially the same as that of the steam in the vulcanizing chamber, means for withdrawing the water from the tube near the entrance end of the tube, a threaded nozzle designed to be screwed to the tapped bore in the exit end of the tube for permitting a filamentary article to be advanced therethrough, and a lock nut for locking the nozzle in a predetermined position with respect to the orifice.

8. In an apparatus for making vulcanized articles including an elongated vulcanizing chamber, means for introducing into the chamber a vulcanizing medium under high pressure and at a high temperature, a pressure cooling and sealing unit which comprises a tube connected to the vulcanizing chamber having a tubular, double re-entry orifice positioned between the entrance end thereof at a point near the exit end thereof, said tube being provided with a tapped bore in the exit end thereof, means for introducing cold water under a static pressure substantially the same as the steam in the vulcanized chamber into the tube at a point between the exit end of the tube and the double re-entry orifice therein, means for withdrawing the water from the tube at the entrance end of the tube, adjustable means for regulating the rate of flow of the water through the water-withdrawing means, a threaded nozzle designed to be screwed to the tapped bore in the exit end of the tube for permitting a filamentary article to be advanced therethrough, and a lock nut for locking the nozzle in a predetermined position with respect to the orifice.

GEORGE E. BERGGREN.

REFERENCES CITED

The following references are of record in the file of this patent:

UNITED STATES PATENTS

| Number | Name | Date |
|---|---|---|
| 1,265,340 | Kaman | May 7, 1918 |
| 2,325,036 | Case | July 27, 1943 |
| 2,373,816 | De Roche et al. | Apr. 17, 1945 |